(12) United States Patent
Chen et al.

(10) Patent No.: US 8,750,205 B2
(45) Date of Patent: Jun. 10, 2014

(54) MULTIPLE RANK CQI FEEDBACK FOR CELLULAR NETWORKS

(75) Inventors: Runhua Chen, Dallas, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 425 days.

(21) Appl. No.: 12/851,257

(22) Filed: Aug. 5, 2010

(65) Prior Publication Data

US 2011/0032839 A1 Feb. 10, 2011

Related U.S. Application Data

(60) Provisional application No. 61/232,224, filed on Aug. 7, 2009, provisional application No. 61/255,310, filed on Oct. 27, 2009.

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC .......... 370/203, 208, 252, 254, 255, 328, 338
See application file for complete search history.

(56) References Cited

U.S. PATENT DOCUMENTS

| | | | |
|---|---|---|---|
| 7,978,623 B1 * | 7/2011 | Kotecha | 370/252 |
| 2009/0046569 A1 * | 2/2009 | Chen et al. | 370/203 |
| 2009/0046570 A1 * | 2/2009 | Sarkar et al. | 370/203 |
| 2009/0109873 A1 * | 4/2009 | Shen et al. | 370/254 |
| 2009/0238298 A1 * | 9/2009 | Kim et al. | 375/267 |
| 2009/0252091 A1 * | 10/2009 | Tang et al. | 370/328 |
| 2009/0257356 A1 * | 10/2009 | Frederiksen et al. | 370/252 |
| 2010/0097949 A1 * | 4/2010 | Ko et al. | 370/252 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 9, V9.1.0, Mar. 2010, Valbonne, France, pp. 1-85.
3GPP, "3rd Generation Partnership Project; Technical Specification Group Radio Access Network; Evolved Universal Terrestrial Radio Access (E-UTRA); Multiplexing and channel coding", 3GP TS 36.212, Release 8, V8.4.0, Sep. 2008, Valbonne, France, pp. 1-56.
3GPP, "3rd Generation Partnership Project; Technical Specification Group Radio Access Network; Evolved Universal Terrestrial Radio Access (E-UTRA); Physical layer procedures", 3GPP TS 36.213, Release 8, V8.5.0, Dec. 2008, Valbonne, France, pp. 1-74.
Runhua Chen and Eko Nugroho Onggosanusi, "Multiple CQI Feedback for Cellular Networks", U.S. Appl. No. 12/819,182, filed Jun. 19, 2010, pp. 1-39.

* cited by examiner

*Primary Examiner* — Hong Cho
(74) *Attorney, Agent, or Firm* — Ronald O. Neerings; Wade James Brady; Frederick J. Telecky, Jr.

(57) ABSTRACT

Single user and multiuser MIMO transmission in a cellular network may be performed by a base station (eNB) transmitting either one, two, or more transmission layers. A user equipment (UE) receives a reference symbol from the base station. The UE processes the reference symbol with one or more of a plurality of precoding matrices to form a plurality of channel quality indices (CQI). The UE provides feedback to the eNB comprising one or more feedback CQI selected from the plurality of CQI and one or more precoding matrix indicators (PMI) identifying the one or more precoding matrices used to form each of the one or more feedback CQIs for two or more ranks.

18 Claims, 3 Drawing Sheets

MULTIPLE RANK CQI FEEDBACK FOR CELLULAR NETWORKS

CLAIM TO PRIORITY UNDER 35 U.S.C. 119

The present application claims priority to and incorporates by reference U.S. provisional application No. 61/232,224 filed on Aug. 7, 2009, entitled "Scheduling and Link Adaptation for DL MU-MIMO with Codebook-based Feedback." The present application also claims priority to and incorporates by reference U.S. provisional application No. 61/255,310 filed on Oct. 27, 2009, entitled "Scheduling and Link Adaptation for DL MU-MIMO with Codebook-based Feedback."

FIELD OF THE INVENTION

This invention generally relates to wireless cellular communication, and in particular to multi-input multi-output transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware may be portable.

User equipment (UE), also commonly referred to as a terminal or a mobile station, may be a fixed or mobile device and may be a wireless device, a cellular phone, a personal digital assistant (PDA), a wireless modem card, and so on. Uplink communication (UL) refers to a communication from the UE to the NodeB, whereas downlink (DL) refers to communication from the NodeB to the UE. Each NodeB contains radio frequency transmitter(s) and the receiver(s) used to communicate directly with the UE, which may move freely around it. Similarly, each UE contains radio frequency transmitter(s) and the receiver(s) used to communicate directly with the NodeB. In cellular networks, the UE cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA (orthogonal frequency division multiple access) and SC-FDMA (single carrier FDMA) access schemes were chosen for the down-link (DL) and up-link (UL) of E-UTRA, respectively. User equipments are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8, or later)."

Several types of physical channels are defined for the LTE downlink. One common characteristic of physical channels is that they all convey information from higher layers in the LTE stack. This is in contrast to physical signals, which convey information that is used exclusively within the physical (PHY) layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. In downlink transmission, two types of reference signals are available. The first type of reference signal is un-precoded and is transmitted over the entire system bandwidth of a cell, and is generally referred to as cell-specific reference signal (CRS). Another type of reference signal is modulated by the same precoder as applied on the data channel, and therefore enables a UE to estimate the effective precoded MIMO channel characteristics. This type of RS is sometimes referred to as De-Modulation RS or DMRS. DMRS is transmitted only when a UE is being scheduled, and is therefore only transmitted over the frequency resource assignment of data transmission. DMRS can also be applied in uplink transmission (PUSCH), in case a UE transmitter is equipped with multiple antennas. An RS may also be transmitted for other purposes, such as channel sounding (SRS), synchronization, or any other purpose. Also note that the Reference Signal (RS) can be sometimes called the pilot signal, or the training signal, or any other equivalent term.

The LTE PHY can optionally exploit multiple transceivers and antenna at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following, for example: cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal maximum system data rate since data is transmitted by a single antenna and is processed at the receiver via two or more receivers.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle on the same time/frequency resources. Once the channel impulse responses are known, data can be transmitted from both antennas simultaneously. The linear combination of the two data streams at the two receiver antennas results in a set of two equations and two unknowns, which are resolvable into the two original data streams.

Physical channels are mapped to specific transport channels. Transport channels are service access points (SAPs) for higher layers. Each physical channel has defined algorithms for bit scrambling, modulation, layer mapping, precoding, and resource assignment. Layer mapping and precoding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. Layer mapping specifies exactly how the extra transmitter antennas are employed. For non-codebook based precoding, the precoding applied for the demodulation reference signal (DMRS) is the same as the one applied for the PUSCH (for uplink) and PDSCH (for downlink). Multiplexing of the demodulation reference signals can be time-division multiplexing, frequency division multiplexing, code division multiplexing or a combination of them.

Precoding is used in conjunction with spatial multiplexing. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distributed onto several physical antennas.

In LTE Rel-8, single layer beamforming on antenna port 5 is already supported. Single-layer beamforming is based on non-codebook precoding and relies on a dedicated demodulation reference symbol (DMRS) for data demodulation. DMRS symbols are precoded with the same precoding matrices as the PDSCH data symbols and therefore enable UE to estimate the "effective" channel after precoding. Rank-1 transmission is enforced. A UE is restricted to receive a single transport block (codeword) which is mapped to one layer (data stream) in DL transmission. From the UE's perspective, the effective 1-layer channel appears as if data is transmitted from a single virtual antenna. DMRS corresponding to this layer is defined as antenna port 5 in LTE Rel-8 to enable channel estimation.

A very simple multi-user MIMO (MU-MIMO) scheme is currently supported in 3GPP LTE Rel-8 specification. A higher-layer configured semi-static MU-MIMO mode is configured so that a UE knows that the eNB will attempt to schedule it with one or multiple other UEs. Codebook-based precoding is used where the precoding matrices for a UE are selected from a pre-defined set (i.e. codebook) of fixed matrices (i.e. precoding matrices/vectors). CQI feedback is important for informing the DL channel status to the eNB in order to perform accurate DL link adaptation (e.g. rank, precoding matrices, modulation and coding schemes, frequency-selective scheduling) and UE scheduling. Since a UE does not know which other UEs it will be scheduled together and what precoding matrices will be used for the co-schedule UE, CQI feedback in Rel-8 is based on single-user MIMO (SU-MIMO) precoding. Due to such a constraint, CQI report for MU-MIMO mode in Rel-8 is highly unreliable, which consequently limits the performance of Rel-8 MU-MIMO.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
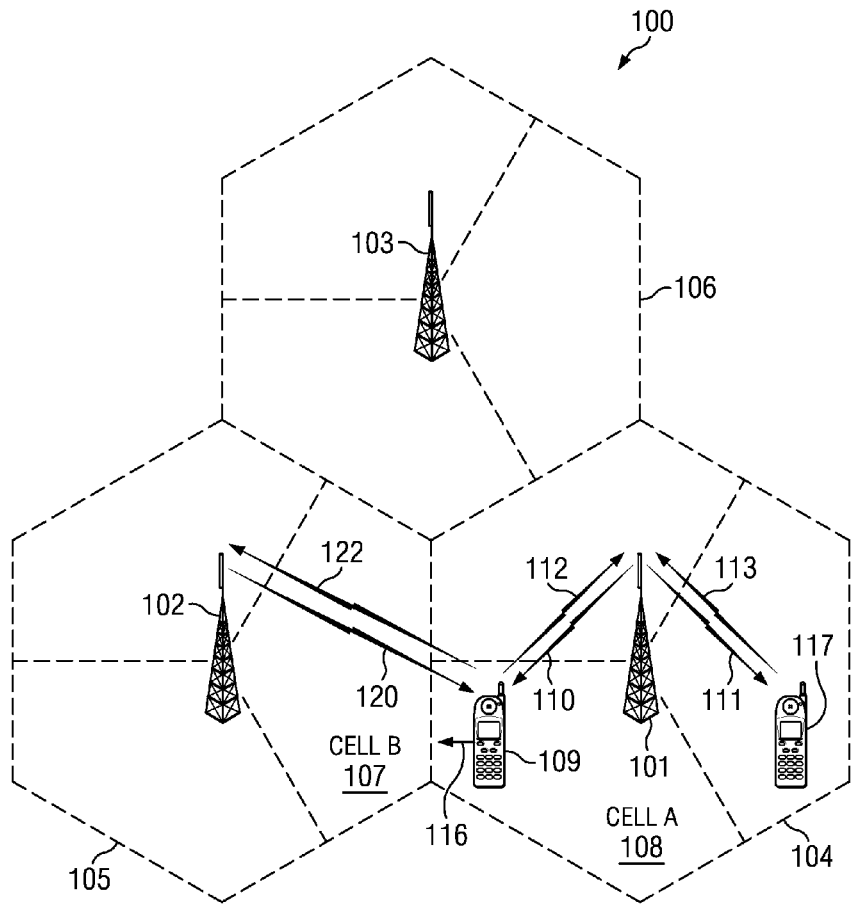
FIG. 1 is a pictorial of an illustrative telecommunications network in which an embodiment of the invention is used to support single user and multiuser MIMO transmission signals.

A downlink multiuser MIMO (DL MU-MIMO) communication system involves a single eNB transmitting to multiple UEs at the same time over the same frequency bandwidth. One example of DL MU-MIMO scheme is the dirty-paper coding approach, which from the information theory perspective is the optimal MU-MIMO scheme in terms of achieving the maximum sum capacity. An alternative and more practical MU-MIMO scheme is transmit precoding, where the data to each UE is multiplied to a UE-specific precoding matrix and then transmitted at the eNB antenna array simultaneously.

A UE that can best estimate channel conditions and then signal the best coding to use will get the best performance out of the channel. Although the use of a codebook for precoding limits the best fit to the channel, it significantly simplifies the channel estimation process by the UE and the amount of uplink signaling needed to convey the desired precoding. Multi-user MIMO (MU-MIMO) complicates the process of providing channel feedback. Various embodiments of an improved multiple rank feedback protocol for use with MU-MIMO applications will be described in this disclosure. Specifically, a mechanism is described such that upon receiving the SU-MIMO CQI/PMI report from multiple UEs, the eNB can accurately estimate the post-processing MU-MIMO CQI, even though the SU-MIMO CQI/PMI is derived by the UE without a-priori information of the co-scheduled users.

For best operation, a transmitter must have knowledge of the channel, which is provided by the UE on the uplink control channel. This process is generally referred to as channel station information (CSI) feedback. This knowledge may include a channel quality index (CQI), a precoding matrix Indicator (PMI), and a rank indication (RI). CSI feedback (RI/PMI/CQI) are recommended MIMO transmission properties derived at the UE based on the channel estimation. For example, RI is the recommended number of transmission layers (rank). PMI reflects the recommended precoding matrices within the recommended rank (RI). CQI is the observed channel quality indicator (e.g. recommended modulate and coding scheme) assuming that the RI/PMI feedback are used for MIMO precoding. The PMI feedback uses a codebook approach to provide an index into a predetermined set of precoding matrices. For 2×2 MIMO, there may be three different codewords for rank-2 precoding, and four different codewords for rank-1 precoding; for 4×2 there may be 16 codewords for rank-1 and rank-2, respectively. Since the channel is continually changing, sub-band CQI and PMI information may be provided for multiple points across the channel bandwidth, at regular time intervals, up to several hundred times a second. The RI is typically provided at a much lower rate on a wideband basis.

The general procedure for determining and specifying CQI and PMI is defined in the EUTRA specifications, for example: "$3^{rd}$ Generation Partnership Project; Technical Specification Group Radio Access Network; Evolved Universal Terrestrial Radio Access (E-UTRA); Physical layer procedures (TS 36.213 Release 8, or later)," which is incorporated by reference herein.

FIG. 1 is a pictorial of an illustrative telecommunications network 100 in which an embodiment of the invention is used to support single user and multiuser MIMO transmission signals, as described in more detail below. The illustrative telecommunications network includes eNBs 101, 102, and 103, though in operation, a telecommunications network may include many more eNBs or fewer eNBs. Each of eNB 101, 102, and 103 is operable over corresponding coverage areas 104, 105, and 106. Each eNB's coverage area is further divided into cells. In the illustrated network, each eNB's coverage area is divided into three cells. Handset or other UE 109 is shown in Cell A 108, which is within coverage area 104 of eNB 101. Transmission is occurring between eNB 101 and UE 109 via downlink channel 110 and uplink channel 112. As UE 109 moves 116 out of Cell A 108, and into Cell B 107, UE 109 may be "handed over" to eNB 102.

When UE 109 is not up-link synchronized with eNB 101, non-synchronized UE 109 employs non-synchronous random access (NSRA) to request allocation of up-link 112 time or frequency or code resources. If UE 109 has data ready for transmission, for example, traffic data, measurements report, tracking area update, etc., UE 109 can transmit a random access signal on up-link 112 to eNB 101. The random access signal notifies eNB 101 that UE 109 requires up-link resources to transmit the UE's data. ENB 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by eNB 101, UE 109 may adjust its transmit timing, to bring the UE 109 into synchronization with eNB 101, and transmit the data on up-link 112 employing the allotted resources during the prescribed time interval. eNB 101 also sends a downlink grant to UE 109 when the eNB has data to transmit to UE 109. The downlink grant specifies one or more resource blocks on which the eNB will transmit to the UE on downlink 110.

Similarly, UE 117 may communicate with eNB 101 on downlink 111 and uplink 113. eNB 101 may decide to send data on DL 111 in SU-MIMO transmission to UE 117. Alternatively, eNB 101 may decide to send data on DL 110 to UE 109 and on DL 111 to UE 117 in MU-MIMO transmission using the same frequency resources, as will be described in more detail below. In either case, an improved scheme for providing CQI reports indicative of multiple ranks is embodied in each UE and used by the eNB for improved scheduling and downlink data transmission, as will be described in more detail below.

Implicit Channel State Information (CSI) Feedback

With spatial multiplexing, a base station (Evolved Universal Terrestrial Radio Access Node B or eNB) may send multiple data streams (or layers) to UEs in downlink transmission using the same frequency. The number of such layers or streams is defined as the rank. For LTE Rel-8, a UE needs to estimate the DL channel and report the recommended rank indicator (RI) to the serving eNB. The UE also must report the channel quality indicator (CQI) and the precoding matrix indicator (PMI) which is an index to the precoding matrix in a codebook. These indicators form a set of recommended transmission property to the serving eNB. Upon receiving this feedback from the UE (RI/PMI/CQI), the eNB performs corresponding downlink MIMO transmission scheduling.

Implicit CSI (CQI/PMI/RI) feedback are based on a predefined set of codebooks, which are a set of matrices calculated offline and known at the eNB and UE. Codebook of rank-r consists of a number of Nt×r matrices where Nt is the number of eNB transmit antennas. UE feedback includes the following information:

Rank indicator (RI): number of data stream;

Precoding matrix indictor (PMI): the index of the UE recommended precoding matrix in the rank-r codebook. For E-UTRA LTE Rel-8, a single PMI is reported for each frequency subband, corresponding to the RI report; and Channel quality indicator (CQI): quality of the channel (e.g. in the form of supportable data rate, SNR). The reported CQI is associated with the reported PMI.

MU-MIMO Communication

Without loss of generality, assume a multiuser MIMO system with Nt transmit antennas at the eNB, Nr receive antennas per UE, and K=2 UEs in the system. The receive signal is given by $$y_1 = H_1 V_1 s_1 + H_1 V_2 s_2 + n_1$$

$$y_2 = H_2 V_1 s_1 + H_2 V_2 s_2 + n_2$$

where $V_1$ and $V_2$ are the precoding matrices for user 1 and 2, $s_1$ and $s_2$ are the data vectors for user 1 and 2, $H_j$ are the channel matrix from the eNB to the j-th user, and $n_1$ and $n_2$ are the received noise. The design principle of MU-MIMO is to find precoding matrices $V_1$ and $V_2$ to minimize, or completely avoid inter-user interference, where $$H_1 V_2=0, H_2 V_1=0$$

while achieving a good system performance for the effective single-user channel $H_1 V_1$ and $H_2 V_2$.

CSI-Feedback in Support of MU-MIMO

Three types of CSI feedback are envisaged for Rel-9 and Rel-10 LTE Advanced: explicit direct channel feedback, explicit covariance matrix feedback, and implicit report.

With explicit direct channel feedback, the direct unprocessed DL channel matrices H is reported to the eNB, possibly with quantization and compression. This gives the most detailed channel information to eNB to design the DL MU-MIMO precoding. However, the feedback overhead is extremely high as the channel coefficient associate with each transmit-receive antenna pair needs to be reported, including both the I and Q components.

With explicit covariance matrix feedback, a UE reports the transmit channel covariance matrix R=sum(H'*H), where summation is performed over time and/or frequency domain. Note the feedback can be wideband or frequency-selective. In terms of time domain granularity, long-time channel covariance matrix could be reported (e.g. R is averaged over a long time duration and reported very sporadically), or alternatively the short-term channel covariance matrix can be reported (e.g. R is averaged over a few subframes).

For an implicit report, the target UE reports a recommended MIMO transmission property, which may include the rank indicator (RI), precoding matrix indicator (PMI) and CQI. The reported RI, PMI, CQI of user k is a function of the channel of user k, and is independent with the other users' channel. Since the UE does not know a priori which other UE it will be co-scheduled (on the same bandwidth), and what are the precoding matrices of the other UE, the reported RI, PMI and CQI are essentially based on a hypothesis of SU-MIMO precoding.

Upon receiving the (RI, PMI, CQI) report from all UEs, the eNB will perform downlink scheduling to decide which group of UEs can be jointly scheduled. Specifically, for each possible set of users to be scheduled on the same bandwidth (e.g. $\Psi$=(U1,U2) where U1 and U2 are the indices of two users), the serving eNB will derive the post-processing MU-MIMO precoding matrices (which may be non-codebook based) and the post-processing MU-MIMO CQI for deciding the appropriate modulation and coding scheme. Note that the resultant MU-MIMO precoding matrix and CQI are in general functions of the channels of all users in the user set $\Psi$, and hence are functions of the reported (SU-MIMO) CQIs and PMIs from all the users.

The eNB searches over all possible UE sets $\Psi$ to find the optimum UE set that achieves the maximum downlink performance. In other words, for a given set of UEs $\Psi$, the eNB derives the post-processing MU-MIMO CQI/precoder, based on the SU-MIMO CQI/PMI report from the set of UEs. For the following description, it will be assumed the UE is restricted to rank-1 single-layer precoding. However it's straightforward to apply the scheme to multiuser systems with rank greater than one transmission per user, as will be described in more detail later.

Transformed MU-MIMO Precoding with PMI Feedback

Although the channel state information feedback (CQI and PMI) is codebook-based, the actual downlink precoding after eNB processing can be non-codebook based. Based on the CQI/PMI feedback from multiple UEs, an eNB performs a transformation on the channel feedback to derive the actual downlink precoding matrices. Denote the report from user k as ($V_k$, $CQI_k$). $\overline{V}_1$ and post-processing $\overline{CQI_k}$, which can be expressed as a function of the SU-MIMO PMI/CQI report of UEs, i.e.

$$\overline{V}_k = f(V_1, V_2, \ldots V_K, CQI_1, CQI_2, \ldots, CQI_K)$$

$$\overline{CQI_k} = p(V_1, V_2, \ldots V_K, CQI_1, CQI_2, \ldots, CQI_K)$$

Here f( ) and p( ) is the transformation function used to derive the post-processing precoding matrices and CQIs, respectively. Note that f( ) and p( ) can be linear or non-linear functions. It is possible that f( ) and p( ) are functions of the individual SU-MIMO CQI/PMI/channel of all or a subset of UEs in $\Psi$, or alternatively f( ) and p( ) may be functions of the concatenated CQI/PMI/channel of all UEs in $\Psi$.

In one embodiment, a precoding solution is based on regularized zero-forcing BF (RZFBF). In this embodiment, an aggregated PMI report V=[$V_1, V_2$] is derived, where $V_1$ is the Nx1 precoding matrix feedback from UE1, $V_2$ is the Nx1 precoding matrix feedback from UE2.

A regularized zero-forcing is performed as follows:

$$F = V^*(V'V + alpha\ I)^{-1} = [F_1, F_2],$$

where alpha is a positive regularization factor (scalar) to improve the numerical stability of matrix inversion. Alpha can be arbitrarily selected, or heuristically chosen as a function of channel of all users. For example, alpha can be chosen as $(g_1+g_2)/2$, where $g_1$ and $g_2$ are geometry (linear scale) of UE1 and UE2.

As a result, the post-processing precoding vector for UE1 and UE2 are $F_1$ and $F_2$, both of which are Nx1 vectors. Next, $F_1$ and $F_2$ are normalized as $\overline{V}_1 = F_1/\|F_1\|_F$ and $\overline{V}_2 F_2/\|F_2\|_F$, where $\|.\|_F$ is the Frobenius norm. This ensures the sum transmit power to each UE is constant. Note that the above example of RZFBF is simply an example of eNB beamforming algorithm for deriving the MU-MIMO beamforming vector based on each user's SU-MIMO PMI feedback. In practice many other algorithms can also be applied.

CQI Derivation for DL Scheduling

The CQI report from UEs is essentially SU-MIMO CQI conditioned upon the (single-user) PMI report. Based on the CQI report from all users (e.g. $CQI_1$ and $CQI_2$), eNB needs to derive the post-processing MU-MIMO CQI to perform downlink scheduling, choose the appropriate MCS level, decide UE paring, etc. For a given UE se $\Psi=(U_1, U_2 \ldots, U_K)$ the post-processing MU-MIMO CQI used for downlink scheduling could be explicitly derived as a function of the SU-MIMO CQI/PMI report of UE that will be co-scheduled, as well as the post-processing precoding matrices. More specifically, $$\overline{CQI_k} = p(V_1, V_2, \ldots V_K, CQI_1, CQI_2, \ldots, CQI_K)$$

Case Study for a Two-User System

Below is an example of the CQI derivation for the regularized zero-forcing BF for a two user system. Without loss of generality, analysis of user 1 is described. Analysis for user 2 can be done in a similar way. Denote $$\begin{bmatrix} \alpha_{11} & \alpha_{12} \\ \alpha_{21} & \alpha_{22} \end{bmatrix} = (V'V + \alpha I)^{-1},$$

such that $$F_1 = V_1 \alpha_{11} + V_2 \alpha_{21},\ F_2 = V_1 \alpha_{12} + V_2 \alpha_{22},$$

The post-processing beamforming vectors for UE1 and UE2 are $$\overline{V}_1 = F_1/\|F_1\|_F \text{ and } \overline{V}_2 = F_2/\|F_2\|_F.$$

The SU-MIMO CQI report of UE1 (i.e. $CQI_1$) can be derived as $R_1*H_{11}*V_1$ where $R_1$ is the equalization vector (e.g. MRC equalizer) for SU-MIMO precoding. Since $V_1$ is the preferred SU-MIMO precoding vector based only on $H_1$, it is reasonable to assume that $V_1$ is a quantized version of the effective channel after receiver equalization, i.e.

$$V_1 = (R_1^H H_1)^H.$$

Alternatively, the receiver equalizer R1 should be a MRC filter of the effective precoded channel $$R_1 = (H_1 V_1)^H.$$

If the regularization factor alpha is sufficiently small, the residual inter-user interference $$H_1 * F_2 \cdot / \|F_2\|_F$$

can be assured to be sufficiently small and omitted. Hence it is safe to assume the RX equalizer under MU-MIMO precoding $\overline{R_1}$ is sufficiently close to the RX equalizer under SU-MIMO precoding $R_1$, i.e. $\overline{R_1} = R_1$. Hence, after RX equalization, the received signal at UE k can be derived as $$\begin{pmatrix} r_1 \\ r_2 \end{pmatrix} = \begin{pmatrix} \overline{R}_1^H H_1 \\ \overline{R}_2^H H_2 \end{pmatrix} (V)(V'V + \alpha I)^{-1} \begin{pmatrix} 1/\|F_1\|_F & 0 \\ 0 & 1/\|F_2\|_F \end{pmatrix}$$
$$\begin{pmatrix} s_1 \\ s_2 \end{pmatrix} + \begin{pmatrix} n_1 \\ n_2 \end{pmatrix}$$
$$= \begin{pmatrix} \sqrt{CQI_1} & 0 \\ 0 & \sqrt{CQI_2} \end{pmatrix} (V'V)(V'V + \alpha I)^{-1}$$
$$\begin{pmatrix} 1/\|F_1\|_F & 0 \\ 0 & 1/\|F_2\|_F \end{pmatrix} \begin{pmatrix} s_1 \\ s_2 \end{pmatrix} + \begin{pmatrix} n_1 \\ n_2 \end{pmatrix}.$$

Denote $$(V'V)(V'V + \alpha I)^{-1} = \begin{bmatrix} \beta_{11} & \beta_{12} \\ \beta_{21} & \beta_{22} \end{bmatrix}.$$

The post-processing CQI can be derived as $$\frac{CQI_1/2 \times (\beta_{11}^2) \cdot /\|F_1\|^2}{1 + CQI_1/2 \times (\beta_{12}^2/\|F_2\|^2)}$$

Similarly, the post-processing CQI of user 2 can be derived as $$\frac{CQI_2/2 \times (\beta_{22}^2) \cdot /\|F_2\|^2}{1 + CQI_2/2 \times (\beta_{21}^2/\|F_1\|^2)}$$

Generalization to K>2 User System

For a UE set $\Psi = (U_1, U_2, \ldots, U_K)$ with K>2 UEs, the post-processing MU-MIMO precoding vector for the k-th user, under regularized ZF beamforming, is given by $$\overline{V}_k = F_k / \|F_k\|_F$$

where $F_k$ is the k-th column of matrix $V = [V_1, \ldots V_K]$, $V_j$ being the SU-MIMO PMI report from the j-th user, $1 \le j \le K$.

The post-processing MU-MIMO CQI of the k-th user is given by $$\frac{CQI_k(\beta_{kk}^2) \cdot /(K \times \|F_k\|^2)}{1 + \left(CQI_k \times \sum_{j=1, j \ne k}^{K} \beta_{kj}^2 / (K \times \|F_j\|^2)\right)}$$

$$\text{where } (V'V)(V'V + \alpha I)^{-1} = \begin{bmatrix} \beta_{11} & \ldots & \beta_{1K} \\ \ldots & \ldots & \ldots \\ \beta_{K} & \ldots & \beta_{KK} \end{bmatrix}.$$

Note that the above is only an example of eNB algorithm for predicting the MU-MIMO post-beamforming CQI based on each user's SU-MIMO CQI. In practice many other algorithms can also be applied. In addition, outer-loop link adaptation can be used to further refine the CQI prediction based on the ACK/NAK response from downlink data transmission.

Enhanced Feedback for DL MU-MIMO

In the previous section, a transformation-based MU-MIMO scheme was described with implicit CSI feedback from a UE. In a nutshell, each UE reports the single-user CSI feedback (e.g. rank, PMI, CQI) without any knowledge or hypothesis on the SU/MU operation. Upon receiving the feedback from multiple UEs, a serving eNB performs a transformation on the CSI feedback to derive the actual downlink precoding matrices $\overline{V}_k$ and post-processing $\overline{CQI_k}$ for link adaptation purpose, which can be expressed as a function of the SU-MIMO PMI/CQI report, i.e.

$$\overline{V}_k = f(V_1, V_2, \ldots V_K, CQI_1, CQI_2, \ldots, CQI_K)$$

$$\overline{CQI_k} = p(V_1, V_2, \ldots V_K, CQI_1, CQI_2, \ldots, CQI_K)$$

Here f( ) and p( ) is the transformation function used to derive the post-processing precoding matrices and CQIs, respectively. One example of the transformation function f( ) is the zero-forcing (ZF) beamforming function denoted as $$(V)(V'V + \alpha I)^{-1} \begin{pmatrix} \|F_1\|_F & 0 & 0 \\ 0 & \|F_2\|_F & \\ 0 & 0 & \|F_K\|_F \end{pmatrix}^{-1}$$

where $V = [V_1, V_2, \ldots V_K]$, $V_j$ (j=1,2,K) being the PMI report from the j-th UE, and $F_j$ is the j-th column of $(V)(V'V + \alpha I)^{-1}$.

As a result, the beamforming vector is:

$$\overline{V}_k = \frac{F_k}{\|F_k\|}.$$

In order to simultaneously transmit to two (or more) users in DL MU-MIMO, properly designed beamforming vectors need to be applied at the base station to separate and differentiate the users in the spatial domain. This is to ensure that inter-user interference can be pre-cancelled at the transmitter, so that the mobile terminals do not need to perform complicated interference cancellation. As a result, it is more appropriate to pair two UEs with sufficiently large spatial separation in MU-MIMO mode, than two highly correlated UEs that are adjacent to each other. For example, two users whose angle-of-departures from the base station are more distinct will have a smaller spatial correlation between each other; therefore, they can be better supported in MU-MIMO transmission. On the other hand, two closely located UEs may suffer from insufficient spatial freedom and result in poor MU performance, and is therefore more appropriate to be scheduled in SU-MIMO transmission. In a system-level scenario where there are a reasonable number of UEs present in the network, the eNB scheduler can most likely find a pair of sufficiently separated UEs for MU-MIMO operation, hence the spatial separation can be guaranteed by eNB scheduling. However, when there is only a smaller number of UEs in the system which happen to be closely located, means to improve the CSI feedback and exploit the spatial separation are desirable to improve the MU performance.

In the following, an enhanced MU-MIMO scheme is described with extended implicit CSI feedback. Without loss of generality consider a hypothetical set of two users, user 1 and user 2. In the conventional solution, each UE reports only one rank-1 SU-MIMO precoding vector, as well as a single CQI value associated with the reported rank-1 PMI. The ZFBF transformation, prior to normalization, is given by $$G=(V)(V'V+\alpha I)^{-1} \text{ where } V=[V_1 V_2].$$

In an embodiment of the invention, a UE reports multiple (e.g. N>1) single-user PMIs instead of only one SU-PMI. The 1-st PMI may be the optimal single-user PMI that results in the optimal SU-MIMO performance. The remaining N-1 PMIs provide additional information of the channel to facilitate the beamforming transformation. A number of criteria could be used to derived the N-1 PMIs, for example:

Example 1: N-1 PMIs with the maximum distance to the $1^{st}$ PMI, where the distance can be e.g. Euclidean distance, Fubini-norm distance, etc;

Example 2: N-1 PMIs with the minimum distance to the $1^{st}$ PMI, where the distance can be e.g. Euclidean distance, Fubini-norm distance, etc;

Example 3: N-1 PMIs with the highest/lowest correlation to the $1^{st}$ PMI;

Example 4: The next (N-1) best SU-MIMO PMIs that result in the optimal SU CQI. For example, if N=2, the $2^{nd}$ best PMI is reported along with the $1^{st}$ best PMI;

Example 5: Alternatively, the (N-1) worst SU-MIMO PMIs that results in the smallest SNR and therefore the worst SU performance; or A combination of the above.

In addition, N CQIs are reported where the j-th CQI is associated with the j-th SU PMI report.

eNB Procedure (Assuming a Hypothetical Set of Two Ues Only)

Upon receiving the UE feedback of N PMI/CQIs, for each UE, the eNB chooses a representative PMI from the set of N PMIs. The selection can be random or pre-configured. For example: eNB chooses the $1^{st}$ PMI (the optimal SU PMI) for each UE.

If the representative PMIs of two UEs are different, eNB performs ZFBF beamforming. Otherwise, if the representative PMIs of two UEs are identical, for one of the UE, eNB replaces the representative PMI by another PMI in the set of N PMI reports. Such replacement may be random or pre-configured. For example, eNB can use the $2^{nd}$ best PMI as the representative PMI and replace the $1^{st}$ best PMI. Alternatively, for each UE, eNB may choose one from the N corresponding PMIs such that their PMIs are not identical.

The above procedure is repeated until the representative PMIs of UEs are different from each other. Then eNB performs transformation (e.g. ZFBF) to derive the beamforming vectors.

Enhanced Feedback for DL MU-MIMO

SU-MIMO refers to a system where a frequency resource block (RB) is occupied by a single UE exclusively at a particular time instant. On the other hand, MU-MIMO refers to a system where a RB can be occupied by two UEs simultaneously at a given time. In several conventional wireless communication standards (e.g. LTE Rel-8), a UE is semi-statically configured in either SU or MU-MIMO mode by higher-layer RRC signaling. Switching between SU and MU-MIMO mode occurs at a low rate. CSI reported by the UE is only required to target the specific MIMO mode.

Dynamic switching is an important feature for advanced wireless communication system. With dynamic switching, SU-MIMO and MU-MIMO transmission are transparent, and switching between SU and MU-MIMO transmission can occur frequently (e.g., every subframe—1 ms basis). Because the UE does not know a priori the exact MIMO transmission, UE feedback to facilitate downlink MIMO transmission must take into account both SU-MIMO and MU-MIMO aspects in order to facilitate the dynamic switching and UE scheduling/paring. This is in contrast to semi-static mode switching where UE feedback can assume either a SU or MU hypothesis.

In the following sections, several advanced implicit CSI feedback schemes (CQI/PMI/RI) are described to better support the dynamic MIMO mode switching.

Multi-Rank PMI/CQI Feedback

In various embodiments of the invention, multi-rank PMI/CQI feedback is provided. A UE reports multiple precoding vectors, each of which belongs to different rank codebooks. For each reported PMI, CQIs are also reported assuming downlink transmission using the reported PMI.

The UE may report PMIs associated with rank $r_1, r_2 \ldots r_L$, where L is the number of reported ranks, and $r_i$ is the RI of the i-th reported rank. A total of $N=N_{r1}+N_{r2} \ldots N_{rL}$ PMIs are reported, where $Nr_i$ is the number of PMI report in the rank-$r_i$ codebook. In other words, the UE reports $Nr_1$ rank-$r_1$ PMIs, $Nr_2$ rank-$r_2$ PMIs, so on and so forth. Assuming the codebook-size for each rank is M, the PMI feedback overhead is $$N^*\log_2(M)$$

It should be noted that $Nr_i$ (i=1 . . . L)>=0 should be a non-negative integer value. If $Nr_i$=0, no rank-$r_i$ PMIs are reported.

The number of rank reports L, as well as the range of ranks $r_1, r_2, \ldots r_L$ for PMI reports, can be determined by the UE, or semi-statically configured by higher-layer signaling (at eNB). For example, if the UE is in very low geometry range, the UE may choose to only feedback PMIs of low-ranks. This is because it's less likely for the UE to support high-rank multi-layer reception due to the limited signal quality. For instance, the UE may report rank-1 and rank-2 PMIs when UE observes poor channel condition and therefore can only support a small number of spatial data streams. On the other hand, if the UE sees favorable channel condition and high geometry, the UE can choose to report PMIs of higher ranks, e.g. rank-3 and rank-4 PMIs to facilitate MIMO transmission with a larger number of data streams.

It is also possible for the eNB to configure the range of rank reports for the UE $r_1, r_2, \ldots r_L$. As a similar example, if the eNB estimates that the UE is in low/high geometry range, the eNB may configure the UE to report only low/high ranks. Estimation of UE geometry or channel condition can be based on long-term radio resource management (RRM) measurement, e.g. reference signal received quality (RSRQ) or reference signal received power (RSRP).

The number of reported ranks L, can be determined by the UE or configured by the eNB. An eNB may configure UE to report only a single rank value (L=1). Rel-8 feedback falls within this paradigm. This is appropriate when the eNB will frequently schedule UE in a particular MIMO transmission (SU or MU) without fast switching. For example, in a low-loaded cell where most of the downlink MIMO transmission will occur in SU transmission, eNB may configure UE to always report a single rank value for SU-MIMO transmission. Alternatively, when the cell is highly loaded with a large number of UEs, and the eNB will schedule downlink MIMO transmission in MU-MIMO frequently, eNB may also configure the UE to report a single rank (e.g. rank-1) and the corresponding PMIs.

An eNB may configure UE to report multiple rank values (L>1). For instance, if the network topology favors dynamic SU/MU switching (e.g. very bursty data traffic), eNB may configure the UE to report multiple ranks PMIs (e.g. rank-1 and rank-2), to facilitate dynamic SU/MU switching.

Similarly, the number of rank reports L can be determined by the UE and sent to the eNB. This can be done in a separate feedback channel different from the RI/CQI/PMI feedback, e.g. at a very low rate. Alternatively, L can be jointly encoded or reported with RI/CQI/PMI.

The values of $Nr_i$ can be either determined by the UE (e.g. based on the UE estimation of the DL channel), or configured by eNB with semi-static higher-layer signaling. In either case, the values of $Nr_i$ should change at a very low-rate, compared to the feedback frequency of CQI/RI/PMI.

When a UE reports a single-rank (L=1) and a single PMI (Nr=1) per subband, UE feedback may fall back to the conventional implicit CSI framework (e.g. Rel-8).

Nested PMI Feedback with Multi-Rank PMI/CQI Feedback

A nested structure is an important feature for codebook design and has been adopted in LTE Rel-8 standard. With the nested property, a precoding matrix in a lower-rank codebook is a sub-matrix of the precoding matrix corresponding to the same PMI value in a higher-rank codebook. With nested codebook structure, CQI of a lower-rank can be derived with the CQI of the higher rank, which is very important in case of rank-override, where an eNB determines to use a smaller rank than the UE reported RI value. This also reduces the CQI calculation and rank adaptation complexity at the UE.

If a nested structure is supported in the codebook, it is possible to reduce the PMI feedback overhead by reporting the precoding matrices of different ranks corresponding to the same PMI values. In other words, a single set of Nr PMIs are reported for all the rank $r_1, r_2 \ldots r_L$, as opposed to the separate/independent PMI report for different ranks where $N=N_{r1}+N_{r2}+ \ldots N_{rL}$ PMIs are fed back.

This reduces the PMI feedback overhead by L times where L is the number of ranks configured for PMI reports. For example, without nested PMI feedback, a UE reports rank-1 PMI and corresponding CQI, and rank-2 PMI and corresponding CQI. The rank-1 PMI and rank-2 PMI are not necessarily identical. The feedback overhead is 2 PMIs+rank-1 CQI+rank-2 CQIs. With nested PMI feedback, the UE reports one PMI value corresponding to both rank-1 and rank-2 codebook. The UE also reports rank-1 CQI corresponding to the rank-1 precoding with the reported PMI, and rank-2 CQI corresponding to the rank-2 precoding with the reported PMI. Hence, the feedback overhead becomes: 1 PMI+rank-1 CQI+rank-2 CQIs.

CQI Feedback with Multi-Rank PMI/CQI Feedback

In this section, an embodiment is described where CQI of different ranks can be jointly reported to reduce the CQI feedback overhead. It is possible to jointly report the CQI of different ranks, as opposed to separate feedback. It is also possible to only report CQIs corresponding to higher rank PMIs, while CQI corresponding to PMIs of lower-ranks can be derived by the higher-rank CQIs at the eNB. Therefore, CQI corresponding to lower rank PMIs do not need to be reported explicitly. This nested CQI feedback structure is particular useful when nested PMI feedback is supported.

For example: assuming a UE reports a single rank-2 PMI value, together with two CQIs corresponding to the two-layer transmission using the rank-2 PMI, denoted as $CQI_{2,1}$ and $CQI_{2,2}$. The rank-1 CQI value, denoted as $CQI_{1,1}$, can be explicitly reported with the corresponding rank-1 PMI report. Alternatively, if nested PMI report is configured, the rank-1 PMI value is identical to the rank-2 PMI value. As a result, $CQI_{1,1}$ can be derived from $CQI_{2,1}$ since the rank-1 PMI precoding vector corresponding to the $1^{st}$ column of the rank-2 PMI precoding matrix. Hence, $CQI_{1,1}$ doesn't need to be reported, but can be estimated at the eNB as a function of $CQI_{2,1}$ and $CQI_{2,2}$. For example, $CQI_{1,1}=2\,CQI_{2,1}$ where the multiplication of two takes into account the power increase of the $1^{st}$ layer.

Nested PMI+Nested CQI Feedback

In another embodiment, a nested PMI and a nested CQI report can be jointly configured. A single set of PMI report is used for all ranks. Assuming a single PMI per rank is needed, the feedback overhead is therefore $\log_2(M)$, as opposed to $$L \times \log_2(M)$$

CQI corresponding to the PMI in a higher rank is jointly encoded with the CQI corresponding to the same PMI in a lower-rank. It is possible to only report CQIs of higher ranks, which can be used to derive CQI of lower ranks at the eNB. With nest PMI and nested CQI report, it is possible that the feedback overhead remains exactly the same as conventional CQI/PMI/RI report for SU-MIMO, without any dynamic SU/MU switching hypothesis. For example, instead of feeding back: rank-1 PMI+rank-2 PMI+rank-1 CQI+rank-2 CQI a UE may report: rank-2 PMI+rank-2 CQI.

At the eNB, the same PMI value as for rank-2 precoding will be assumed for rank-1 precoding. The rank-1 CQI can be derived with rank-2 CQI due to the nested property.

Table 1 summarizes the various embodiments of multi-rank CQI/PMI feedback.

TABLE 1

Summary of Multi-Rank feedback embodiments

| | RI | PMI | CQI |
|---|---|---|---|
| Multi-rank | Multiple RI reported | Multiple PMIs in each rank, PMIs in different ranks reported. | CQI corresponding to each PMI is reported, encoded separately |
| Multi-rank + nested PMI | Multiple RI reported | A single set of PMI report used for all ranks. | CQI corresponding to each PMI is reported, encoded separately |

TABLE 1-continued

Summary of Multi-Rank feedback embodiments

| | RI | PMI | CQI |
|---|---|---|---|
| Multi-rank + nested CQI | Multiple RI reported | Multiple PMIs in each rank, PMIs in different ranks reported. | CQI corresponding to the PMI in a higher rank is jointly encoded with the CQI corresponding to the same PMI in a lower-rank. |
| Multi-rank + nested CQI + nested PMI | Multiple RI reported | A single set of PMI report used for all ranks. | CQI corresponding to the PMI in a higher rank is jointly encoded with the CQI corresponding to the same PMI in a lower-rank. |

Figure 2:
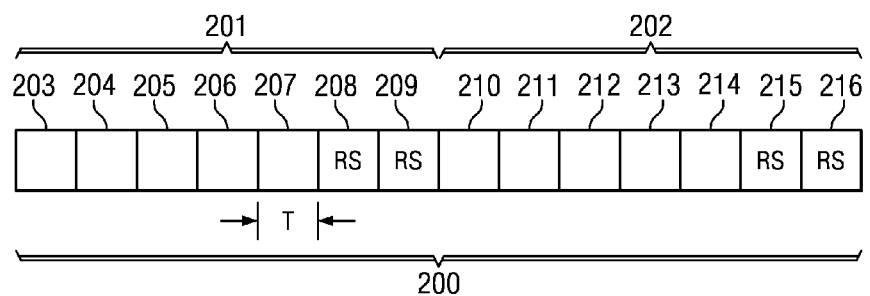
FIG. 2 is an illustrative format of one subcarrier (tone) of a DL transmission subframe for use in the network of FIG. 1.

FIG. 2 is an illustrative format of one subcarrier (tone) of a DL transmission subframe for use in the network of FIG. 1. It comprises of 14 resource elements. Elements of the present invention will be described in the context of EUTRA sub-frame, even though its applicability is broader. Orthogonal frequency division multiple access (OFDMA) based systems include classic OFDMA as well as its alternatives, like single carrier frequency division multiple access (SC-FDMA) and discrete Fourier transform (DFT)-spread OFDMA. In OFDMA based systems, frequency resources are divided into tones. Tones are further grouped into "tone blocks" or "resource blocks" for purposes of frequency-dependent scheduling of mobiles, and other possible purposes. Thus, each mobile can be allocated one or more resource blocks in an OFDMA based system. This group of resource blocks will be denoted as the frequency allocation for a given mobile.

FIG. 2 illustrates just one subcarrier of sub-frame 200 comprising two slots 201 and 202. It includes 14 resource elements. Duration of the EUTRA sub-frame is 1 ms, which means that duration of two slots 201 and 202 is 0.5 ms each. Each slot comprises seven OFDM symbols when a normal cyclic protection field (CP) is appended to each symbol, or six symbols when an extend CP is appended to each symbol. For example, slot 201 comprises symbols 203-209. The slot 202 comprises symbols 210-216. Symbols 208, 209, 215 and 216 are Demodulation (DM) Reference symbols (RS), and are used to derive channel estimates which are needed for coherent demodulation of the remaining symbols that are modulated with payload data. LTE Rel 9 also defines several other antenna port configurations for antenna ports 0-3 and 5, where port 0-3 are unprecoded cell-specific reference symbols (CRS) antenna ports and port 5 is DMRS for single-layer data transmission defined in Rel-8. Each symbol has a time duration equal to approximately T, which is a function of the slot time. In this embodiment, the slot time is 500 μsec. Since the first symbol in the slot has more cyclic prefix samples, not all symbols are exactly equal in duration, as per 3GPP TS36.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec.

In some embodiments of the invention, the set of reference signal sequences comprises CAZAC sequences and near-CAZAC sequences. Near-CAZAC is a term which designates sequences which are obtained using computer search methods, and whose properties approximate CAZAC properties. In some embodiments of the invention, CAZAC sequences are Zadoff-Chu sequences. In some embodiments of the invention, near-CAZAC sequences are sequences of the form $\exp(j*\pi*\phi(n)/4)$; wherein the length of $\phi(n)$ is an integral multiple of 12. Here, "j" is the imaginary unit.

In some embodiments of the invention, the set of reference signal sequences comprises CAZAC sequences only. In some embodiments of the invention, the set of reference signal sequences comprises near-CAZAC sequences only. In some embodiments of the invention, the set of reference signal sequences comprises both CAZAC sequences and near-CAZAC sequences. Sometimes, a phase ramp is applied to modify the first sequence, for example $\exp(j*n*\alpha+j*\pi*\phi(n)/4)$ can still be considered as a reference signal sequence. For 3GPP EUTRA, there are 30 possible sequences of length 24, which are also near-CAZAC. For length 36 and more, sequences are produced from CAZAC sequences. Thus, the set of reference signal sequences comprises both CAZAC and near-CAZAC sequences.

Further details on the construction of reference signals, demodulation reference signals and sounding reference signals are included in 3rd Generation Partnership Project; GPP TS 36.211 V9.1.0 (2010) "Technical Specification Group Radio Access Network; Evolved Universal Terrestrial Radio Access (E-UTRA); Physical Channels and Modulation," in particular in section 6 and which is incorporated herein by reference.

There are currently two definitions of "transparency". A first type of transparency is defined in terms of SU/MU-MIMO mode. Non-transparency means that a UE is semi-statically configured in either the SU or MU-MIMO mode which is signaled to the UE via higher layer signaling. UE is semi-statically configured to operate in SU-MIMO transmission mode or MU-MIMO transmission mode, hence different DL (downlink) control and UE feedback are used. Higher layer (L3) radio resource control (RRC) signaling configures the SU/MU-MIMO mode for the UE. Transparency means that the UE is configured in one joint transmission mode that does not differentiate SU/MU MIMO transmission, thus the same UE feedback and DL control is applied.

A second type of transparency is defined in terms of knowledge of the co-scheduled UE. Non-transparency means that the presence of a co-scheduled UE is known and possibly taken into account in the DL control signaling and UE feedback. On the other hand, non-transparency means that UE is agnostic about the presence of a co-scheduled UE, hence the same UE feedback and DL control is used.

Regardless of which definition is used, "transparency" essentially means that no signaling is provided to the UE regarding transmission to the other UEs in the same time/frequency resources. If the presence of a co-scheduled UE is provided to the target UE, MU-MIMO transmission is "non-transparent". For example, in LTE Rel-8, MU-MIMO is a semi-statically configured transmission mode, hence a UE will know that it will be paired up with another UE if it is configured in such a transmission mode. Another possibility is to signal to the UE dynamically whether or not transmission to another UE is present, that is, a dynamic downlink grant has been provided on the PDCCH. In this case, a UE can be either configured in the semi-static SU or MU-mode.

Figure 3:
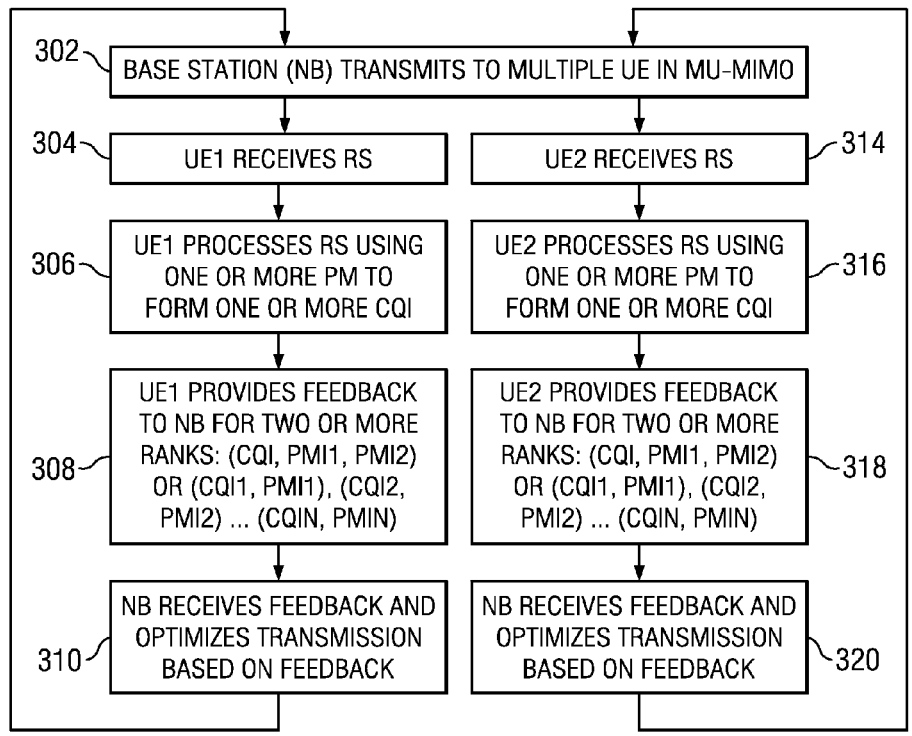
FIG. 3 is a flow diagram illustrating enhanced CQI feedback in MU-MIMO operation in the network of FIG. 1.

FIG. 3 is a flow diagram illustrating enhanced CQI feedback in MU-MIMO operations. An eNB in a given cell is transmitting 302 to multiple UE in MU-MIMO transmission on different resource blocks. As described earlier, the downlink transmission includes reference symbols (RS) that may be used by the UE to determine channel quality. A first UE, (UE1) receives 304 a reference symbol from the base station (eNB). Simultaneously, a second UE (UE2) may also receive 314 the same signal on a different beam.

Each UE processes 306, 316 the reference symbol with one or more of a plurality of precoding matrices to form a plurality of channel quality indices (CQI) for each of two or more ranks as described in more detail above.

Each UE provides feedback 308, 318 to the eNB comprising one or more CQI reports selected from the plurality of CQI for each of the two or more ranks, and one or more precoding matrix indicators (PMI) identifying the one or more precoding matrices used to form each of the one or more CQI reports.

In another embodiment, each of the plurality of CQI for each of the two or more ranks is formed using a different combination of two or more of the plurality of precoding matrices. The feedback comprises two or more PMI identifying the combination of precoding matrices used to form each of the one or more feedback CQI. In particular, each combination of precoding matrices may include at least a first precoding matrix recommended for UE1, and a second precoding matrix recommended for a hypothetical UE2 to be co-scheduled with the UE. Since UE1 is not aware of UE2 and visa versa, each UE processes the RS and assumes there is a hypothetical UE that is operating with it.

As described earlier, processing 306, 316 may calculate a correlation between each combination of precoding matrices and select for feedback only combinations having a lower correlation. In some embodiments, only combinations having a correlation below a selected threshold are selected for feedback.

Alternatively, as described earlier, processing 306,316 may calculate a distance between each combination of precoding matrices and select for feedback only combinations having a larger distance.

In some embodiments, each of the plurality of CQI reports corresponds to a precoding matrix recommended for the UE for each of the two or more ranks.

In some embodiments, the entire plurality of CQI and respective precoding matrix indicators are provided 308, 318 as feedback for each of the two or more ranks.

A serving eNB receives 310, 320 feedback from the UE comprising one or more CQI reports selected by the UE from the plurality of CQI reports formed by the UE for each of two or more ranks and one or more precoding matrix indicators (PMI) identifying the one or more precoding matrices used by the UE to form each of the one or more feedback CQIs. The eNB uses the CQI for each of the two or more ranks and the PMI included in the feedback to select a precoding matrix for use by the eNB for transmission of data to each UE in single user or in multiuser transmission.

Figure 4:
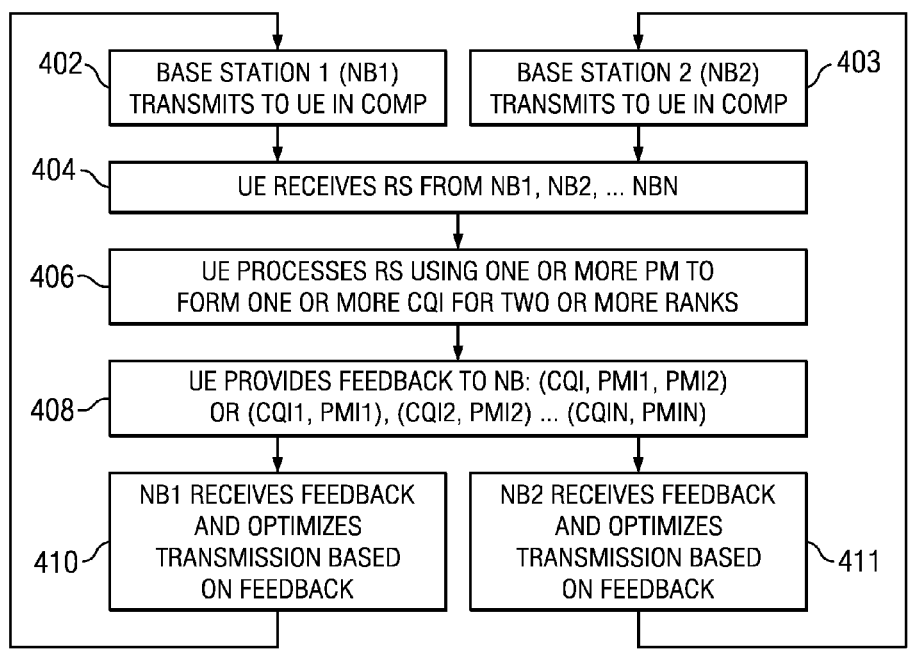
FIG. 4 is a flow diagram illustrating enhanced CQI feedback in CoMP operation in the network of FIG. 1.

FIG. 4 is a flow diagram illustrating enhanced CQI feedback in CoMP operation. Coordinated Multiple Point (CoMP) transmission has been proposed as a promising technology to meet the spectral efficiency requirement in Rel-10. As opposed to conventional cellular network where a single UE receives data transmission from a single eNB at a time, multiple eNBs may coordinately design the downlink transmission to a UE simultaneously on the same frequency resources. In order to reduce the DRS overhead and assist PDSCH demodulation, DRS from different CoMP transmission points should be configured in the same time/frequency resources. In other words, the same frequency domain offset of DRS should be used at different CoMP transmission points.

The basic idea of CoMP is to extend the conventional "single cell—multiple UEs" system structure to a "multiple cells—multiple UEs" network topology so that the concept of cell edge UE would give way to that of a UE in the vicinity of cell boundaries being at the center area of a "super-cell" consisting multiple cells. Hence, UEs in CoMP communication mode will get much better service and boosted SNR if several nearby cells work in cooperation, where the involved cells are called CoMP cooperating cells.

For CoMP operation, when UE 109 is close to a cell boundary, eNB 101 also coordinates with eNB 102 via a backhaul interconnecting network to determine which resource to allocate to UE 109 so that both eNBs can cooperate to transmit in CoMP manner. Once the UE is synchronized, the eNB may both simultaneously send data and reference symbols (RS) on DL in MIMO mode to UE 109, using DL 110 and 120, and receive data and feedback on UL 112 and 122, for example.

In CoMP mode, two or more eNB are transmitting 402, 403 to a UE in CoMP mode on the same RB. As described earlier, the downlink transmission includes reference symbols (RS) that may be used by the UE to determine channel quality. Depending on the CoMP configuration, all of the cooperating eNB may be transmitting to the UE using exactly the same resources, or the cooperating eNB may be transmitting to the same UE using different resources, such as different resource symbols.

In the illustrated embodiment, the UE receives 404 a first reference symbol (RS1) from eNB1 and also a different RS2 from cooperating eNB2.

The UE processes each of the received reference symbols with one or more of a plurality of precoding matrices to form a set of channel quality indices (CQI) for RS1 and another set of CQI for RS2 for each of two or more ranks.

The UE provides feedback 408 to the eNB that includes one or more feedback CQI and PMI selected for the first RS and one or more feedback CQI and PMI selected for the second RS for each of the two or more ranks.

eNB1 receives 410 the feedback and dynamically optimizes transmission based on the one or more feedback CQI selected for RS1 for each of the two or more ranks and eNB2 simultaneously receives 411 the feedback and dynamically optimizes transmission based on the one or more feedback CQI for each of two or more ranks selected for RS2. If there are more than two eNB cooperating, a similar process is performed by each eNB.

System Example

Figure 5:
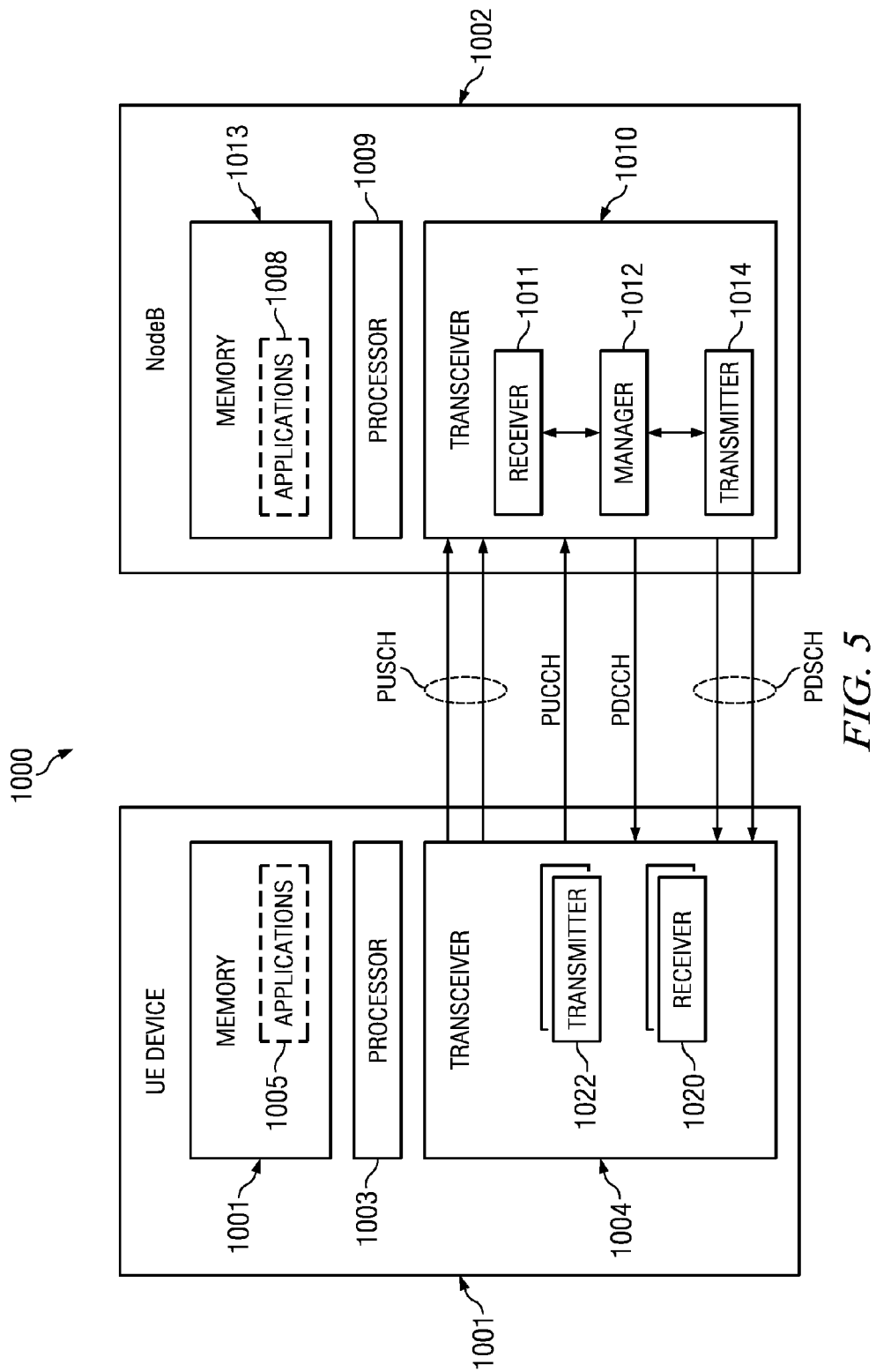
FIG. 5 is a block diagram illustrating an exemplary portion of a cellular network with a base station in communication with a mobile device.

FIG. 5 is a block diagram illustrating an exemplary portion of the cellular network of FIG. 1. As shown in FIG. 5, the wireless networking system 1000 includes a UE device 1001 in communication with an eNB 1002. The UE device 1001 may represent any of a variety of devices such as a server, a desktop computer, a laptop computer, a cellular phone, a Personal Digital Assistant (PDA), a smart phone or other electronic devices. In some embodiments, the electronic UE device 1001 communicates with the eNB 1002 based on a LTE or E-UTRA protocol. Alternatively, another communication protocol now known or later developed may be used.

As shown, UE device 1001 includes a processor 1003 coupled to a memory 1007 and a Transceiver 1004. The memory 1007 stores (software) applications 1005 for execution by the processor 1003. The applications 1005 could be any known or future application useful for individuals or organizations. As an example, such applications 1005 could be categorized as operating systems (OS), device drivers, databases, multimedia tools, presentation tools, Internet browsers, e-mailers, Voice-Over-Internet Protocol (VoIP) tools, file browsers, firewalls, instant messaging, finance tools, games, word processors or other categories. Regardless of the exact nature of the applications 1005, at least some of the applications 1005 may direct eNB (base-station) 1002 to transmit DL signals to UE device 1001 periodically or continuously via the transceiver 1004.

Transceiver 1004 includes uplink logic which may be implemented by execution of instructions that control the operation of the transceiver. Some of these instructions may be stored in memory 1007 and executed when needed. As would be understood by one of skill in the art, the components of the uplink and downlink logic may involve the physical (PHY) layer and/or the Media Access Control (MAC) layer of the transceiver 1004. Transceiver 1004 includes two or more receivers 1020 and two or more transmitters 1022 for SU/MU-MIMO, as described in more detail above.

eNB 1002 includes a Processor 1009 coupled to a memory 1013 and a transceiver 1010. Memory 1013 stores applications 1008 for execution by the processor 1009. The applications 1008 could be any known or future application useful for managing wireless communications. At least some of the applications 1008 may direct the base-station to manage transmissions to or from the user device 1001.

Transceiver 1010 includes a resource manager which enables eNB 1002 to selectively allocate uplink PUSCH resources and downlink PDSCH resources to the user device 1001. As would be understood by one of skill in the art, the components of the resource manager 1012 may involve the physical (PHY) layer and/or the Media Access Control (MAC) layer of the transceiver 1010. Transceiver 1010 includes a Receiver 1011 for receiving transmissions from various UE within range of the eNB and transmitter 1014 for transmission to the various UE within range. The resource manager executes instructions that control the operation of transceiver 1010. Some of these instructions may be located in memory 1013 and executed when needed. The resource manager controls the transmission resources allocated to each UE that is being served by eNB 1002 and broadcasts control information via the physical downlink control channel PDCCH.

During MIMO transmission from eNB 1002 via transmitters 1014 on PDSCH, eNB 1002 monitors channel conditions to adapt to the prevailing condition. This includes monitoring the channel quality indicator (CQI) and precoding matrix index (PMI) feedback provided by UE 1001 on the uplink channel using condition monitoring logic 1012 that is coupled to receiver 1011. As was described in more detail above, the enhanced CQI/PMI feedback includes one or more CQI reports selected from a plurality of CQI for each of two or more ranks, and one or more precoding matrix indicators (PMI) identifying the one or more precoding matrices used to form each of the one or more CQI reports.

During MIMO transmission to UE 1001 via transmitters 1014 on PDSCH, eNB 1002 forms DMRS signals, depending on the number of layers being used for transmission, as described in more detail above.

A typical eNB will have multiple sets of receivers and transmitters which operate generally as described herein to support hundreds or thousand of UE within a given cell. Each transmitter may be embodied generally by a processor 1009 that executes instructions from memory 1013 to perform the scrambling, mapping, and OFDM signal formation, using signal processing techniques as are generally known in the art along with embodiments of the invention described herein.

As described in more detail above, the eNB transmits a reference signal for reception by a UE. The eNB then receives feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs. The eNB uses the CQI for each of the two or more ranks and the PMI included in the feedback to select a precoding matrix for use by the eNB for transmission of data to the UE in single user or in multiuser transmission modes.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to DL transmission, it may be equally applied to UL transmission.

Embodiments of the invention may support single user (SU) dual-layer beamforming in LTE Rel-9 for both LTE-TDD (time division duplex) and FDD (frequency division duplex) using UE specific demodulation reference signals and mapping of physical data channel to resource elements that may provide forward compatibility with LTE-A Demodulation RS (DMRS). Embodiments of the invention extend single user dual-layer beamforming to multi-user dual-layer beamforming. Embodiments of the invention is also applicable to beamforming of up to 8 layers in LTE Rel-10, and may be extended to MIMO system with more than 8 layers in future advanced communication systems.

The term "frame" and "subframe" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource.

Embodiments of this invention apply to various types of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, an embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method of operating a user equipment device in a cellular network, the method comprising:
  receiving a first demodulation reference signal at the user equipment (UE) from a first base station (eNB);
  computing a plurality of channel quality indicators (CQI) for each of two or more ranks derived from at least the first demodulation reference signal with one or more of a plurality of precoding matrices; and
  transmitting feedback from the UE to the eNB comprising one or more CQI reports selected from the plurality of CQI for each of the two or more ranks, and one or more precoding matrix indicators (PMI) identifying the one or more precoding matrices used to form each of the one or more CQI reports.

2. The method of claim 1, wherein each of the plurality of CQI reports corresponds to a precoding matrix recommended for the UE for each of the two or more ranks.

3. The method of claim 1, wherein the UE is a mobile handset.

4. A method of operating a user equipment device in a cellular network, the method comprising:
  receiving a first reference signal at the user equipment (UE) from a first base station (eNB);
  computing a plurality of channel quality indicators (CQI) for each of two or more ranks derived from at least the first reference signal with one or more of a plurality of precoding matrices, wherein each of the plurality of CQI is formed using a different combination of two or more of the plurality of precoding matrices; and
  transmitting feedback from the UE to the eNB comprising one or more CQI reports selected from the plurality of CQI for each of the two or more ranks, and one or more precoding matrix indicators (PMI) identifying the one or more precoding matrices used to form each of the one or more CQI reports, wherein the feedback for each of the two or more ranks comprises two or more PMI identifying the combination of precoding matrices used to form each of the one or more feedback CQI.

5. A method of operating a user equipment device in a cellular network, the method comprising:
  receiving a first reference signal at the user equipment (UE) from a first base station (eNB);
  computing a plurality of channel quality indicators (CQI) for each of two or more ranks derived from at least the first reference signal with one or more of a plurality of precoding matrices, wherein each of the plurality of CQI is formed using a different combination of two or more of the plurality of precoding matrices;
  calculating a correlation between each combination of precoding matrices and selecting for feedback only combinations having a lower correlation, wherein only combinations having a correlation below a selected threshold are selected for feedback; and
  transmitting feedback from the UE to the eNB comprising one or more CQI reports selected from the plurality of CQI for each of the two or more ranks, and one or more precoding matrix indicators (PMI) identifying the one or more precoding matrices used to form each of the one or more CQI reports, wherein the feedback for each of the two or more ranks comprises two or more PMI identifying the combination of precoding matrices used to form each of the one or more feedback CQI.

6. A method of operating a user equipment device in a cellular network, the method comprising:
  receiving a first reference signal at the user equipment (UE) from a first base station (eNB);
  computing a plurality of channel quality indicators (CQI) for each of two or more ranks derived from at least the first reference signal with one or more of a plurality of precoding matrices;
  calculating a distance between each combination of precoding matrices and selecting for feedback only combinations having a larger distance; and
  transmitting feedback from the UE to the eNB comprising one or more CQI reports selected from the plurality of CQI for each of the two or more ranks, and one or more precoding matrix indicators (PMI) identifying the one or more precoding matrices used to form each of the one or more CQI reports.

7. A method of operating a user equipment device in a cellular network, the method comprising:
  receiving a first reference signal (RS) at the user equipment (UE) from a first base station (eNB);
  receiving a second reference symbol from a second eNB coincidentally with receiving the first reference signal;
  computing a plurality of channel quality indicators (CQI) for each of two or more ranks derived from at least the first reference signal with one or more of a plurality of precoding matrices, wherein the computing comprises forming one or more CQI for each of the first RS and the second RS for each of the two or more ranks using one or more of a portion of the plurality of precoding matrices; and
  transmitting feedback from the UE to the eNB comprising one or more CQI reports selected from the plurality of CQI for each of the two or more ranks, and one or more precoding matrix indicators (PMI) identifying the one or more precoding matrices used to form each of the one or more CQI reports, wherein the feedback comprises one or more feedback CQI and PMI selected for the first RS and one or more feedback CQI and PMI selected for the second RS for each of the two or more ranks.

8. A method for operating a base station device in a cellular network, the method comprising:
transmitting a demodulation reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs; and
using the CQI for each of the two or more ranks and the PMI included in the feedback to select a precoding matrix for use by the eNB for transmission of data to the UE in single user or in multiuser transmission.

9. The method of claim 8, wherein the plurality of CQI is representative of all precoding matrices assigned to the UE, and wherein the entire plurality of CQI and respective precoding matrix indicators are received as feedback for each of the two or more ranks.

10. The method of claim 8, wherein each of the plurality of CQI reports corresponds to a precoding matrix recommended for the UE for the given each of the two or more ranks.

11. A method for operating a base station device in a cellular network, the method comprising:
transmitting a reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI is formed using a different combination of two or more of the plurality of precoding matrices and wherein the feedback comprises two or more PMI identifying the combination of precoding matrices used to form each of the one or more CQI reports; and
using the CQI for each of the two or more ranks and the PMI included in the feedback to select a precoding matrix for use by the eNB for transmission of data to the UE in single user or multiuser transmission.

12. A method for operating a base station device in a cellular network, the method comprising:
transmitting a reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI is formed using a different combination of two or more of the plurality of precoding matrices and wherein the feedback comprises two or more PMI identifying the combination of precoding matrices used to form each of the one or more CQI reports, wherein each combination of precoding matrices comprise of at least a first precoding matrix recommended for the UE, and a second precoding matrix recommended for a hypothetical UE to be co-scheduled with the UE; and
using the CQI for each of the two or more ranks and the PMI included in the feedback to select a precoding matrix for use by the eNB for transmission of data to the UE in single user or in multiuser transmission.

13. A method for operating a base station device in a cellular network, the method comprising:
transmitting a reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI is formed using a different combination of two or more of the plurality of precoding matrices and wherein the feedback comprises two or more PMI identifying the combination of precoding matrices used to form each of the one or more CQI reports wherein the received feedback comprises combinations of PMI selected by the UE that have a lower correlation between each combination of precoding matrices and furthermore only combinations having a correlation below a selected threshold are received as feedback; and
using the CQI for each of the two or more ranks and the PMI included in the feedback to select a precoding matrix for use by the eNB for transmission of data to the UE in single user or in multiuser transmission.

14. A method for operating a base station device in a cellular network, the method comprising:
transmitting a reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI is formed using a different combination of two or more of the plurality of precoding, matrices and wherein the feedback comprises two or more PMI identifying the combination of precoding matrices used to form each of the one or more CQI reports wherein the received feedback comprises combinations of PMI selected by the UE that have a larger distance between each combination of precoding matrices; and
using the CQI for each of the two or more ranks and the PMI included in the feedback to select a precoding matrix for use by the eNB for transmission of data to the UE in single user or in multi user transmission.

15. A method for operating a base station device in a cellular network, the method comprising:
transmitting a reference signal from the base station (eNB) for reception by a user equipment (UE);
receiving feedback from the UE comprising one or more CQI reports selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI is formed using a different combination of two or more of the plurality of precoding matrices and wherein the feedback comprises two or more PMI identifying the combination of precoding matrices used to form each of the one or more CQI reports, wherein each combination of precoding matrices comprise of at least a first precoding matrix recommended for the UE, and a second precoding matrix recommended for a hypothetical UE to be co-scheduled with the UE;

receiving feedback from a second UE comprising one or more feedback CQI selected by the second UE from a plurality of CQI formed by the second UE for each of the two or more ranks and one or more precoding matrix indicators (PMI) identifying the one or more precoding matrices used by the second UE to form each of the one or more CQI reports, wherein each combination of precoding matrices comprise of at least a first precoding matrix recommended for the second UE, and a second precoding matrix recommended for a hypothetical UE to be co-scheduled with the UE; and wherein the eNB uses the feedback from the UE and the second UE to select precoding matrices for use by the eNB for co-scheduled transmission of data to the UE and to the second UE in multi-user multi-input multi-output (MU-MIMO) transmission; and using the CQI for each of the two or more ranks and the PMI included in the feedback to select a precoding matrix for use by the eNB for transmission of data to the UE in single user or in multiuser transmission.

16. A base station apparatus, comprising:

circuitry for transmitting a demodulation reference signal from the base station (eNB) for reception by a user equipment (UE);

circuitry for receiving feedback from the UE comprising one or more feedback CQI selected by the UE from a plurality of CQI reports formed by the UE for each of two or more ranks and one or more precoding matrix indicators (PMI) identifying the one or more precoding matrices used by the UE to form each of the one or more feedback CQIs; and a processor coupled to the circuitry for transmitting and to the circuitry for receiving, the processor operable to use the CQI for each of the two or more ranks and the PMI included in the feedback to select a precoding matrix for use by the eNB for transmission of data to the UE in single user and/or multiuser transmission.

17. The apparatus of claim 16, wherein each of the plurality of CQI reports corresponds to a precoding matrix recommended for the UE for the given each of the two or more ranks, wherein the processor is operable to use the feedback from the UE to select precoding matrices for use by the eNB for co-scheduled transmission of data to the UE and to a second UE in multi-user multi-input multi-output (MU-MIMO) transmission.

18. A base station apparatus, comprising:

circuitry for transmitting a demodulation reference signal from the base station (eNB) for reception by a user equipment (UE);

circuitry for receiving feedback from the UE comprising one or more feedback CQI selected by the UE from a plurality of CQI reports formed by the UE for each of two or more ranks and one or more precoding matrix indicators (PMI) identifying the one or more precoding matrices used by the UE to form each of the one or more feedback CQIs, wherein each of the plurality of CQI reports corresponds to a precoding matrix recommended for the UE for the given each of the two or more ranks; and a processor coupled to the circuitry for transmitting and to the circuitry for receiving, the processor operable to use the CQI for each of the two or more ranks and the PMI included in the feedback to select a precoding matrix for use by the eNB for transmission of data to the UE in single user and/or multiuser transmission, wherein the processor is operable to use the feedback from the UE to select precoding matrices for use by the eNB for co-scheduled transmission of data to the UE and to a second UE in multi-user multi-input multi-output (MU-MIMO) transmission, and wherein the processor is operable to use the feedback comprising CQI for the two or more ranks from the UE and from the second UE to select precoding matrices for use by the eNB for co-scheduled transmission of data to the UE and to the second UE in MU-MIMO transmission.

* * * * *